United States Patent [19]

Brecher et al.

[11] 4,330,523

[45] May 18, 1982

[54] DECOMPOSITION OF WATER

[75] Inventors: Lee E. Brecher, North Huntingdon; Christopher K. Wu, Wilkins Township, Allegheny County, Pa.

[73] Assignee: Westinghouse Electric Corp., Pittsburgh, Pa.

[21] Appl. No.: 7,459

[22] Filed: Jan. 29, 1979

Related U.S. Application Data

[63] Continuation of Ser. No. 661,072, Feb. 25, 1976, abandoned.

[51] Int. Cl.³ .................. C01B 1/02; C01B 13/00; B01J 7/00
[52] U.S. Cl. .................................. 423/579; 422/189; 423/648 R; 423/657
[58] Field of Search .................. 423/579, 648 R, 657, 423/658, 481, 486, 488, 522, 531, 507; 422/189

[56] References Cited

U.S. PATENT DOCUMENTS

| | | | |
|---|---|---|---|
| 1,774,882 | 9/1930 | Girvin | 423/481 |
| 2,143,222 | 1/1939 | Heath | 423/503 |
| 2,406,930 | 9/1946 | Titlestad | 423/522 |
| 3,839,550 | 10/1974 | Wentorf | 423/579 |
| 3,929,980 | 12/1975 | Abraham et al. | 423/648 R |
| 3,939,257 | 2/1976 | Pangborn et al. | 423/658 |
| 3,969,495 | 7/1976 | Dreyfuss | 423/648 R |
| 3,995,016 | 11/1976 | Kittle | 423/579 |
| 4,089,940 | 5/1978 | Norman et al. | 423/648 R |

FOREIGN PATENT DOCUMENTS 2516441  10/1975  Fed. Rep. of Germany ... 423/648 R

*Primary Examiner*—Edward J. Meros
*Attorney, Agent, or Firm*—R. D. Fuerle

[57] ABSTRACT

Water is decomposed into hydrogen and oxygen by reacting it with iodine and sulfurous acid to produce hydrogen iodide and sulfuric acid. The hydrogen iodide is decomposed to produce the hydrogen product and the iodine. The sulfuric acid is decomposed to produce water and sulfur trioxide. The sulfur trioxide is decomposed to produce sulfur dioxide and the oxygen product. The sulfur dioxide is reacted with water to produce the sulfurous acid.

10 Claims, 3 Drawing Figures

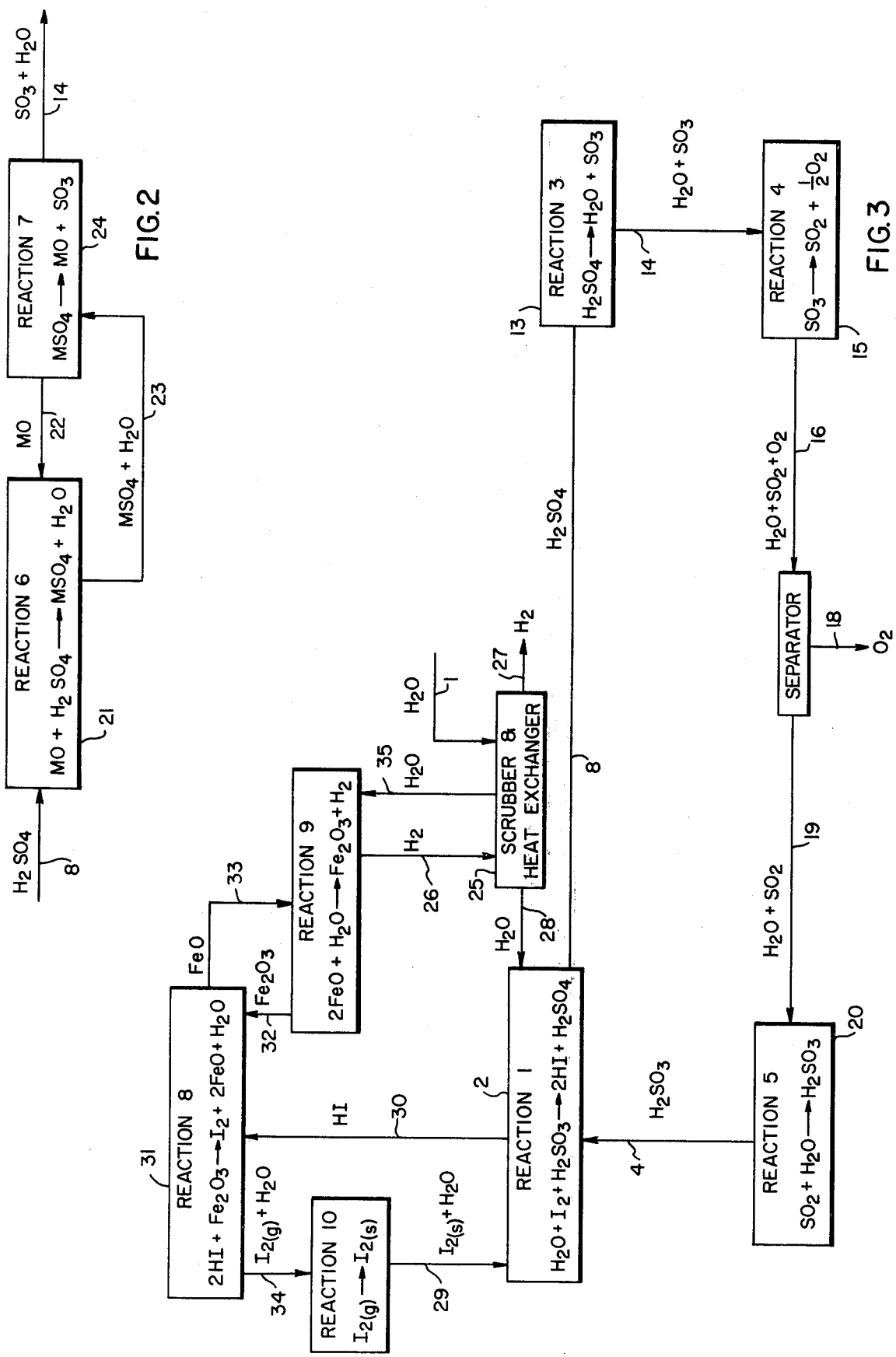

DECOMPOSITION OF WATER

This is a continuation of application Ser. No. 661,072, filed Feb. 25, 1976, now abandoned.

BACKGROUND OF THE INVENTION

The decomposition of water into hydrogen and oxygen, if it can be economically achieved, presents an excellent method of producing a clean-burning fuel and of storing energy for later use. Though there are perhaps hundreds of proposed processes for decomposing water, as yet it has not been determined which will actually work the best. Many processes require electrolytic cells which greatly add to the cost of the process.

PRIOR ART

U.S. Pat. No. 3,888,750 discloses an electrolytic method of decomposing water which uses some of the same steps used in this invention.

Articles by Bodenstein in Z. Physik Chem., volume 13, page 56 (1894), volume 22, page 1 (1897), and volume 29, page 295 (1898) disclose the decomposition of hydrogen iodide into hydrogen and iodine.

The reaction of iodine, water, and sulfurous acid to produce hydrogen iodide and sulfuric acid is disclosed by Kauffman and Funke in Fette and Seifen, volume 44, pages 345 to 346 (1937). It is also disclosed by H. Levin, K. Uhrig, and F. M. Roberts in Industrial and Engineering Chemistry Anal. Ed. 17, 212 (1945).

The reaction of cupric oxide with sulfuric acid to produce cupric sulfate and water is shown by Hoffman and Wanjukow in Trans. AIME., volume 43, page 523 (1913).

The reaction of hydrogen iodide with ferric oxide to produce iodine, ferrous oxide, and water is disclosed by F. J. Hallinan and W. R. Thompson in the Journal of the American Chemical Society, volume 61, page 268 (1939).

The conversion with heat of sulfuric acid into water and sulfur trioxide and the dissolution of sulfur dioxide in water to form sulfurous acid are known chemical reactions.

SUMMARY OF THE INVENTION

We have discovered a process and apparatus for decomposing water into hydrogen and oxygen. Our process requires only heat and is simpler and less expensive than some of the prior processes for electrolytically decomposing water.

The process may be used where excess heat is available, for example in a nuclear reactor, to produce hydrogen and oxygen, which may be used as a clean fuel or to convert coal into synthetic crude oil or natural gas.

DESCRIPTION OF THE INVENTION

FIG. 2 is a block diagram showing an alternative process and apparatus for the vaporizer shown in FIG. 1.

FIG. 3 is a block diagram showing the process and apparatus of FIG. 1, but with an alternative process for the hydrogen iodide generator.

Figure 1:
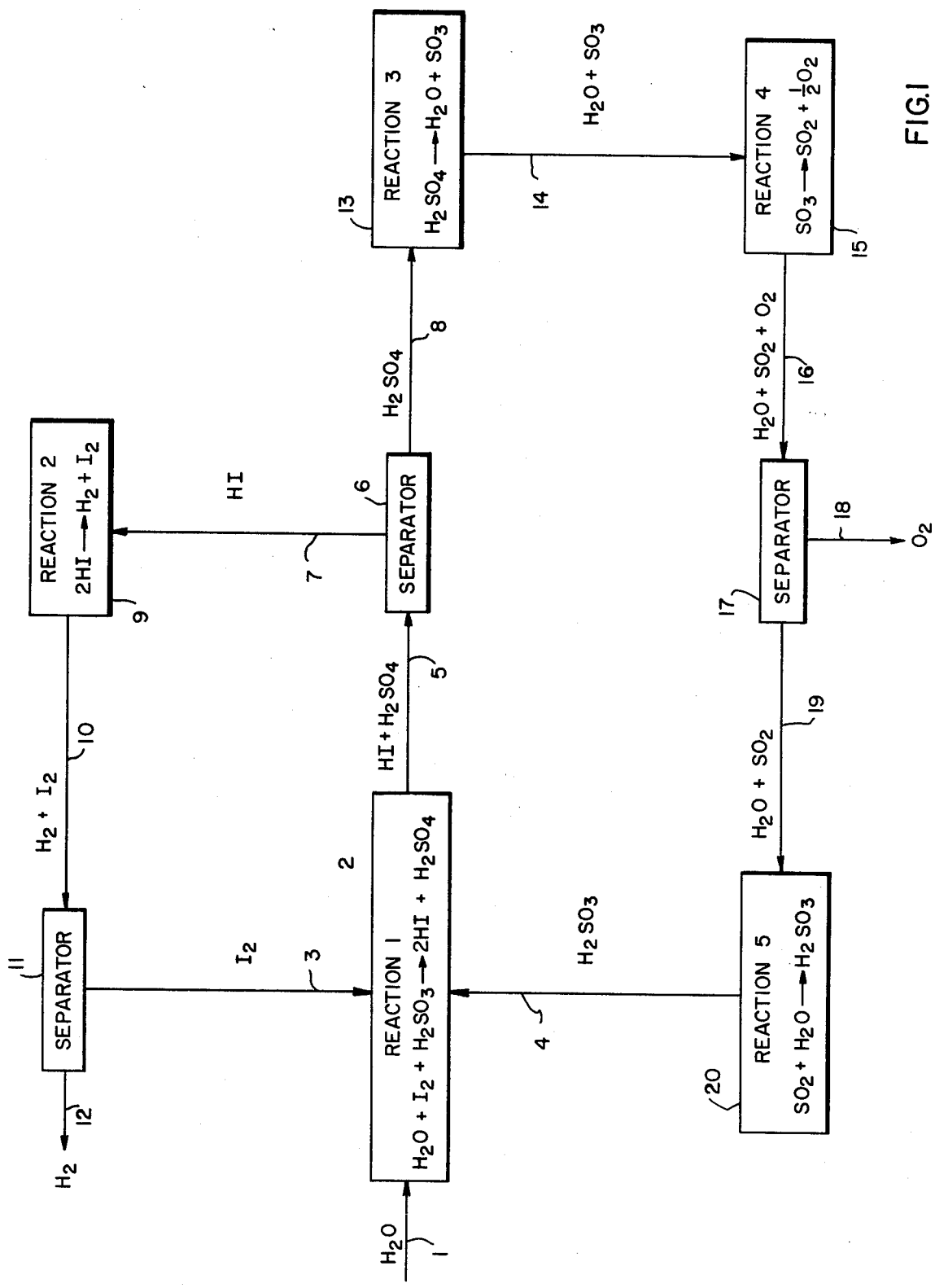
FIG. 1 is a block diagram showing the process and apparatus of this invention.

In FIG. 1, the water 1 to be decomposed is admitted to reactor 2 where it reacts with iodine 3 and sulfurous acid 4 to produce hydrogen iodide and sulfuric acid 5. Separator 6 then separates the hydrogen iodide-sulfuric acid mixture 5 into hydrogen iodide 7 and sulfuric acid 8. The hydrogen iodide 7 is decomposed in reactor 9 into a hydrogen-iodine mixture 10 which is separated by separator 11 into the hydrogen product 12 and iodine 3. From separator 6 the sulfuric acid 8 passes to vaporizer 13 which decomposes it into a mixture 14 of water and sulfur trioxide. Reactor 15 then breaks the sulfur trioxide down into a mixture 16 of oxygen and sulfur dioxide, which along with the water present, moves to separator 17 which separates the mixture into the oxygen product 18 and a mixture 19 of water and sulfur dioxide. In reactor 20 the water and sulfur dioxide are reacted to produce sulfurous acid 4.

In FIG. 2 sulfuric acid 8, instead of going to vaporizer 13, as it did in FIG. 1, now passes to reactor 21 where it is reacted with a metal oxide 22 to produce a metal sulfate and water mixture 23. Reactor 24 then decomposes the metal sulfate into the metal oxide 22 and the water-sulfur trioxide mixture 14 shown in FIG. 1. Generally, the process of FIG. 1 is preferred to the variation shown in FIG. 2 because it is more expensive to handle the solid oxides and sulfates than the liquid sulfuric acid. However, the variation of FIG. 2 may be advantageous if problems are encountered in handling hot sulfuric acid.

In FIG. 3 the water 1 to be decomposed is used in scrubber and heat exchanger 25 to clean hydrogen 26 and extract the heat from it. The hydrogen 27 is the product. Water 28 passes to reactor 2 where it is reacted with sulfurous acid 4 and the solid iodine in iodine-water mixture 29 to produce hydrogen iodide 30 and sulfuric acid 8, which follows the same process shown in FIG. 1. Hydrogen iodide 30, however, passes to reducer 31 where it is reduced with ferric oxide 32 to produce ferrous oxide 33 and gaseous iodine-water mixture 34. The ferrous oxide 33 is reacted with water 35 in reducer 36 to produce ferric oxide 32 and hydrogen 26. The variation of FIG. 3 is preferred to the process of FIG. 1 because it avoids contamination of the hydrogen product with iodine or hydrogen iodide, which may occur in the process of FIG. 1. Contaminants in the hydrogen may interfere with its subsequent use in other processes.

The following table summarizes the various reactions of this invention.

| Reaction No. | Equation | $\Delta F°$ 298 | $\Delta H°$ 298 | T (°K.) |
|---|---|---|---|---|
| 1 | $H_2O_{(l)} + I_{2(s)} + H_2SO_{3(aq)} \rightarrow 2HI_{(aq)} + H_2SO_{4(aq)}$ | −16.8 | −28.5 | 300 |
| 2 | $2HI_{(aq)} \rightarrow H_{2(g)} + I_{2(s)}$ | 24.7 | 26.7 | 1200 |
| 3 | $H_2SO_{4(aq)} \rightarrow H_2O_{(l)} + SO_{3(g)}$ | 32.1 | 54.13 | 600 |
| 4 | $SO_{3(g)} \rightarrow SO_{2(g)} + \frac{1}{2} O_2$ | 16.7 | 23.49 | 1200 |
| 5 | $SO_{2(g)} + H_2O_{(l)} \rightarrow H_2SO_{3(aq)}$ | 0.0 | −7.54 | 300 |
| Overall | $H_2O \rightarrow H_{2(g)} + \frac{1}{2} O_{2(g)}$ | 56.7 | 68.3 | |

-continued

| Reaction No. | Equation | $\Delta F°$ 298 | $\Delta H°$ 298 | T (°K.) |
|---|---|---|---|---|
| 6 | $MO_{(s)} + H_2SO_{4(l)} \rightarrow MSO_{4(s)} = H_2O$ | −10.8 | −15.8 | 900 |
| 7 | $MSO_{4(s)} \rightarrow MO_{(s)} + SO_{3(g)}$ | 42.9 | 69.9 | 1200 |
| 8 | $2HI_{(g)} + Fe_2O_{3(s)} \rightarrow I_{2(g)} + 2FeO_{(s)} + H_2O_{(g)}$ | 9.67 | 14.18 | >600 |
| 9 | $2FeO_{(s)} + H_2O_{(g)} \rightarrow Fe_2O_3 + H_{2(g)}$ | −5.66 | −11.3 | >700 |
| 10 | $I_{2(g)} \rightarrow I_{2(s)}$ | −4.63 | −14.88 | 300 |

In the above table $\Delta F$ is the change in Gibb's free energy at 298° K. and $\Delta H$ is the change in enthalpy at 298° K. The $\Delta F$ figure is the mechanical work required for the reaction and the $\Delta H$ figure is the total energy required. Thus, $\Delta F + \Delta S = \Delta H$ where $\Delta S$ is the heat energy required. Both $\Delta F$ and $\Delta H$ are theoretically derived.

In reaction number 1 the temperature is not critical and it may be conducted at room temperature. Since the reaction is exothermic, cooling is required. Stoichiometric quantities of iodine and water or excess water may be used.

Reaction number 2 may be conducted at a temperature range of about 400° to about 900° C. Optimum temperature ranges have not yet been determined, and therefore the temperature ranges given herein for all reactions should be considered to be approximate.

In reaction number 3 the sulfuric acid can be simply boiled to effect the decomposition. The boiling point is at about 300° C.

Reaction number 4 can be performed at about 750° to about 1000° C. A sulfuric acid contact catalyst such as $V_2O_5$ or platinum is preferably present as it greatly increases the reaction rate. Additional information is described in copending application Ser. No. 661,071, filed on Feb. 25, 1976 by Sandra Spewock and L. E. Brecher, titled "Method and Apparatus For Producing Sulfur Dioxide and Oxygen From Sulfur Trioxide," now abandoned herein incorporated by reference. This reaction proceeds with equilibrium conversion at space velocities of 10,000 $hr^{-1}$. An 81.7% conversion rate has been obtained using a $V_2O_5$ catalyst at 750° C.

Care must be taken not to permit the sulfur trioxide to solidify as it may explode on re-heating.

Temperature is not critical in reaction number 5 though a low temperature (i.e., below 100° C.) is preferred because at high temperatures the solubility of sulfur dioxide in water is very low. An excess of water is necessary because stoichiometric quantities of sulfur dioxide are not soluble in water.

In reaction number 6, which together with reaction number 7 can be substituted for reaction nunber 3, cooling is necessary because the reaction is exothermic. Temperature is not critical and the reaction may be performed at room temperature. An excess of sulfuric acid must be used if the metal oxide is not soluble at stoichiometric proportions. In the equation, M is any metal which forms a sulfate when its oxide is reacted with sulfuric acid. Examples include copper, iron, barium, cadmium, lead, bismuth, and others. Iron and copper are preferred as they are less expensive. Mixtures of metal oxides are also contemplated. Reaction number 7 can be conducted at about 500° to about 900° C.

Reactions 8, 9, and 10 may be substituted for reaction number 2. Reaction numbers 8 and 9 may be conducted at about 200° to about 800° C. Excess water may be used in reaction number 9. Only cooling below about 113.5° C. is necessary in reaction number 10.

We claim:
1. A method of decomposing water into hydrogen and oxygen comprising:
   (1) reacting iodine with said water and sulfurous acid to produce hydrogen iodide and sulfuric acid;
   (2) decomposing said hydrogen iodide to produce said hydrogen and said iodine;
   (3) decomposing said sulfuric acid to produce water and sulfur trioxide by reacting said sulfuric acid with a metal oxide of a metal which forms a sulfate to produce water and said sulfate, and decomposing said sulfate to produce said metal oxide and said sulfur trioxide;
   (4) decomposing said sulfur trioxide to produce sulfur dioxide and said oxygen; and
   (5) reacting said sulfur dioxide with water to produce said sulfurous acid.

2. A method according to claim 1 wherein step (2) is conducted at about 400° to about 900° C., step (3) at about the boiling point of said sulfuric acid, and step (4) at about 750° to about 1000° C. in the presence of a catalyst.

3. A method according to claim 2 wherein said catalyst is vanadium pentoxide, platinum, or a mixture thereof.

4. A method according to claim 1 wherein step (2) is performed by reacting said hydrogen iodide with ferric oxide to produce said iodine and ferrous oxide and water, and reacting said ferrous oxide with water to produce said ferric oxide and said hydrogen.

5. A method according to claim 4 wherein said reaction of said hydrogen iodide with ferric oxide to produce said iodine and ferrous oxide and water, and said reaction of said ferrous oxide with water to produce said ferric oxide and said hydrogen are conducted at about 200° to about 800° C.

6. A method according to claim 1 wherein said sulfate is decomposed to produce said metal oxide and said sulfur trioxide at about 500° to about 900° C.

7. A method according to claim 1 wherein said metal is selected from the group consisting of iron, copper, and mixtures thereof.

8. An apparatus for decomposing water into hydrogen and oxygen comprising:
   (1) a first reactor for reacting iodine with said water and sulfurous acid to produce hydrogen iodide and sulfuric acid;
   (2) a first separator for separating said hydrogen iodide and said sulfuric acid;
   (3) a second reactor for decomposing said hydrogen iodide into said hydrogen and said iodine;
   (4) a second separator for separating said hydrogen and said iodine;
   (5) a vaporizer for decomposing said sulfuric acid into water and sulfur trioxide, where said vaporizer comprises a reactor for reacting said sulfuric acid with a metal oxide of a metal which forms a sulfate to produce said water and said sulfate, and another reactor for decomposing said sulfate into said oxide and said sulfur trioxide;

(6) a third reactor for decomposing said sulfur trioxide into sulfur dioxide and said oxygen; and (7) a third separator for separating said sulfur dioxide and said oxygen; and (8) a fourth reactor for reacting said sulfur dioxide with water to produce said sulfurous acid.

9. An apparatus according to claim 8 wherein said second reactor comprises (1) a reducer for reducing ferric oxide with said hydrogen iodide to produce water, said iodine, and ferrous oxide; and (2) an oxidizer for oxidizing said ferrous oxide with water to produce said ferric oxide and said hydrogen.

10. An apparatus according to claim 9 including a hydrogen scrubber and heat exchanger for scrubbing said hydrogen with said water and extracting heat from said hydrogen into said water.

* * * * *